United States Patent [19]

Dent

[11] Patent Number: 4,765,472

[45] Date of Patent: Aug. 23, 1988

[54] BUCKET ATTACHMENT TOOL HOLDER

[76] Inventor: Robert Dent, 4145 W. 3800 South, West Valley, Utah 84120

[21] Appl. No.: 31,417

[22] Filed: Mar. 30, 1987

[51] Int. Cl.$^4$ ............................................. B65D 85/28
[52] U.S. Cl. .................... 206/373; 220/23.86; 383/39
[58] Field of Search .................... 206/373, 315.5, 372, 206/374; 220/23.4, 23.2, 23.8, 23.83, 23.86; 383/39; 150/52 C

[56] References Cited

U.S. PATENT DOCUMENTS

| | | | |
|---|---|---|---|
| 413,526 | 10/1889 | Light | 220/23.4 |
| 1,094,009 | 4/1914 | Parkhurst | 206/373 |
| 1,434,350 | 10/1922 | Collins | 206/373 |
| 2,507,842 | 5/1950 | Waddill | 383/39 |
| 2,679,877 | 6/1954 | Leggett | 383/39 |
| 2,758,798 | 8/1956 | Schmidt | 206/373 |
| 3,331,513 | 7/1967 | Cappelli | 383/39 |
| 4,164,968 | 8/1979 | Esposito, Jr. et al. | 383/39 |
| 4,362,243 | 12/1982 | Deyesso et al. | 206/373 |
| 4,682,691 | 7/1987 | Spiering | 206/373 |
| 4,715,499 | 12/1987 | Franklin | 206/373 |

Primary Examiner—Joseph Man-Fu Moy
Attorney, Agent, or Firm—Thorpe, North & Western

[57] ABSTRACT

A bucket attachment tool holder for mounting on a conventional bucket having a loop handle. The tool holder includes an elongate piece of flexible material formed with pockets on one side thereof for receiving and holding tools, hook and loop fastener elements disposed near each end of the piece of material, but on opposite sides, for joining the ends together when the piece of material is wrapped around the exterior side walls of a bucket, and two snap hooks disposed on the piece of material at spaced-apart locations near or on a top edge thereof for attaching to the handle of the bucket. When the tool holder is wrapped around the bucket and the snap hooks snapped onto the bucket handle, the pockets of the tool holder face upwardly to receive and carry tools.

8 Claims, 1 Drawing Sheet

BUCKET ATTACHMENT TOOL HOLDER

BACKROUND OF THE INVENTION

The invention described herein relates to a tool holder for attaching to a conventional bucket.

It is common for tile layers, carpenters, cement finishers, "perfatapers", and similar craftsmen to use conventional buckets for not only carrying water, mixing materials, etc., but also for holding and carrying a variety of tools. The tools carried in such buckets vary from large hammers, trowels, cement finishing implements, etc., to smaller tools such as screwdrivers, hole punches, tape measures, etc. As a consequence of placing all such tools in a bucket, the smaller tools tend to settle on the bottom and become more difficult to retrieve.

Electricians and a few other artisans have longed used tool belts which may be wrapped around the waist of a person and which carry various size tools. These tool belts, however, have not been found suitable for use by tile layers, cement finishers, and perfatapers, possibly because the belts are fairly cumbersome and limit the freedom of movement of such artisans. Yet, it would still be desirable to in some fashion keep the smaller tools separated from the larger tools and have them all readily available.

SUMMARY OF THE INVENTION

It is an object of the invention to provide a tool holder suitable for use with a conventional bucket for holding smaller tools such as those used by tile layers, cement finishers, perfatapers, etc.

It is also an object of the invention to provide such a tool holder which may be used in conjunction with a conventional bucket and not interfere with the normal uses of the bucket such as for holding and mixing liquids and carrying larger tools.

It is a further object of the invention to provide a simple, easy to construct, inexpensive tool holder which may be readily attached to and detached from a conventional bucket.

The above and other objects of the invention are realized in a specific illustrative embodiment of a bucket attachment tool holder adapted for mounting and carrying by a conventional bucket. The bucket attachment includes an elongate piece of flexible material formed with pockets on one side for receiving and holding tools and the like, with the pocket openings being generally contiguous with or directed toward a top edge of the material. Fasteners are disposed on the material near each end for joining the ends together when the piece of material is wrapped about the exterior side walls of a bucket. Two coupling elements are disposed on the piece of material at spaced-apart locations near or on the top edge thereof for attaching to either the top rim of the bucket or to the handle of the bucket, so that the pocket openings face upwardly to receive tools.

In accordance with one aspect of the invention, the piece of flexible material comprises a first base strip of flexible material formed to lie generally flat, and a second pocket forming strip of material gathered and then attached to the base strip so as to form pockets between the pocket forming strip and the base strip.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 3:
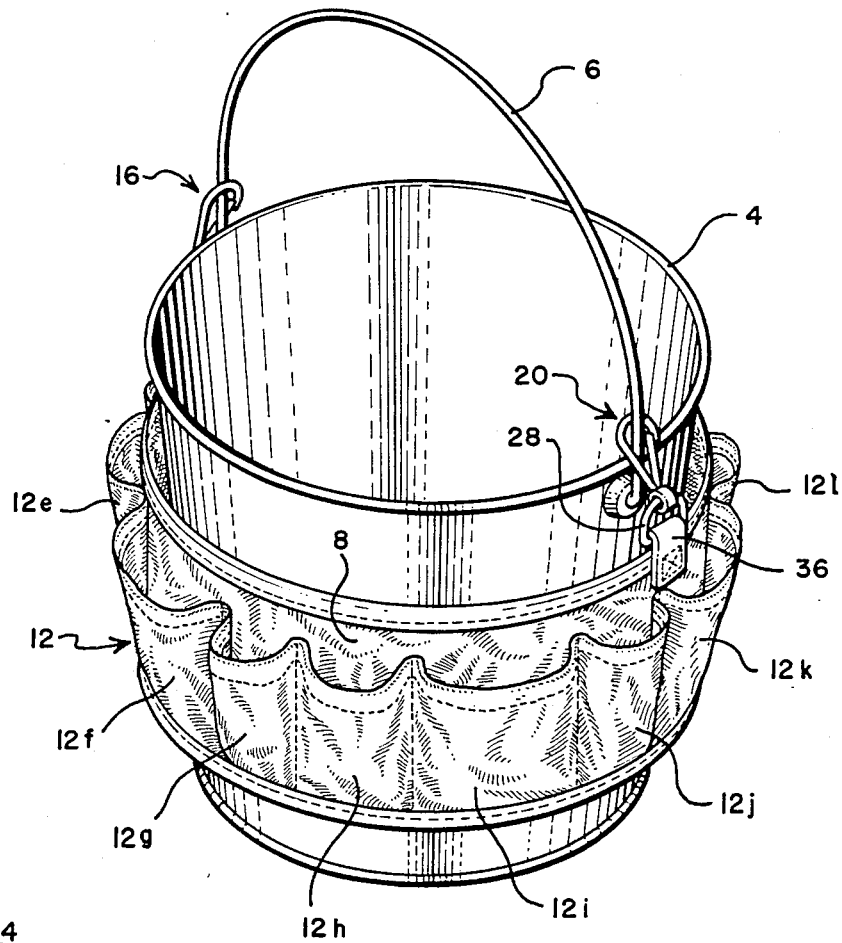
FIG. 3 shows a perspective view of the bucket attachment tool holder mounted on a conventional bucket.

Referring to the drawings, there is shown a specific illustrative embodiment of a bucket attachment tool holder adapted for mounting on a conventional bucket 4 (FIG. 3). The tool holder includes an elongate base strip of flexible material 8, such as canvas, leather, nylon, etc. A second pocket-forming strip of flexible material 12, also made of canvas, leather, nylon, etc., is sewn or otherwise attached to the base strip 8 in such a way as to form a plurality of various size pockets 12a through 12m. In particular, the second strip of material 12 is gathered or loosened at the locations pockets are desired, similar to the manner in which pleats are formed, and then sewn on each side of the pocket to the base strip 8. Use of a single pocket-forming strip 12 simplifies the construction and provides for a sturdier more rugged tool holder. It should be understood, however, that separate pieces of material could also be used to form the individual pockets or pairs of pockets, etc. Of course, pockets of various sizes could be provided to accommodate tools or implements of different size, as shown in the drawings.

Figure 1:
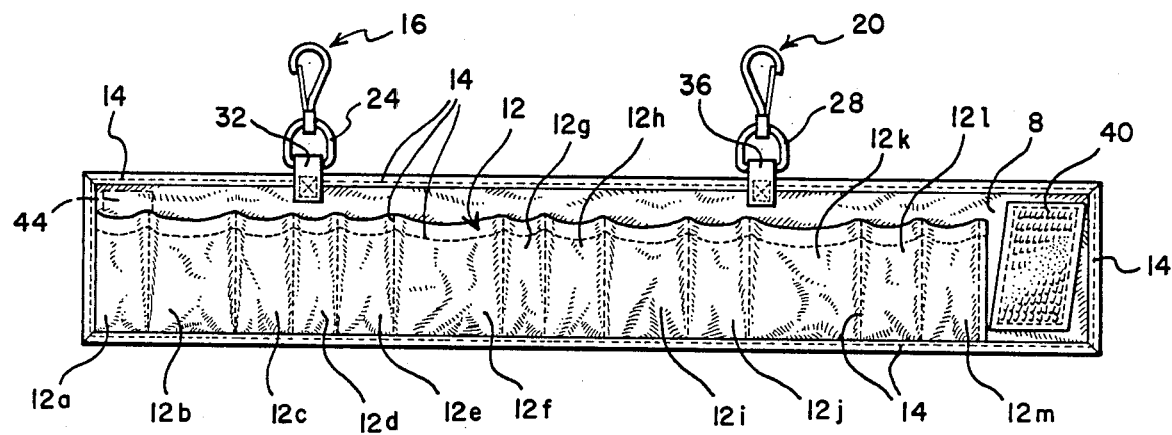
FIG. 1 shows a front, elevational view of a bucket attachment tool holder made in accordance with the principles of the present invention.

The pocket-forming strip of material 12 is attached onto the base strip 8 to extend from one end of the base strip toward and near the other end as shown in FIG. 1. The strip 12 also extends from the bottom edge of the base strip, where sewing or other attachment method is used to close the bottom ends of the pockets, to loci just below the top edge of the base strip 8. Additional sewing, such as that shown at 14, may be used to double over and secure the material to prevent it from fraying.

Attached to the top edge of the base strip of material 8 are a pair of swivel snap hooks 16 and 20. The hooks are held in place by rings 24 and 28 which, in turn, are attached to the base strip simply by loops of material 32 and 36 which are placed through the rings 24 and 28 respectively and then sewn onto the base strip of material 8. The swivel snap hooks 16 and 20 are of conventional design. It should be apparent that other fastening elements could also be utilzed for attaching the tool holder to a conventional bucket.

The tool holder may be attached to the bucket 4 by simply snapping the hooks 16 and 20 onto corresponding sides of a bucket handle 6 as shown in FIG. 3. Alternatively, the hooks 16 and 20 (or similar fasteners) could be placed over the upper rim of the bucket 4 to hold the tool holder in place on the bucket. Of course, if the hook 16 and 20 are to be attached to opposite sides of the bucket handle 6, then the hooks would initially be positioned on the base strip of material 8 so as to be coincident with respective sides of the handle when the tool holder is wrapped about the bucket 4.

Figure 2:
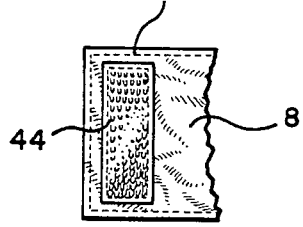
FIG. 2 shows a fragmented back view of one end of the bucket attachment tool holder of FIG. 1.

When the tool holder is wrapped about the bucket 4, with the hooks 16 and 20 snapped in place on the handle 6, the free ends of the tool holder are joined together by fasteners to securely position the tool holder on the bucket. Hook and loop fasteners are used to allow the rapid joining and unjoining of the ends of the tool holder, with one strip of hook and loop fastener 40 being attached (e.g. by sewing) to the front side of the base strip 8 near one end, and a second strip 44 (FIG. 2) being attached to the rear side of the base strip 8 at the opposite end. When the tool holder is wrapped about the bucket 4, the strip 40 mates with the strip 44 to join the free ends of the tool holder and secure the tool holder tightly around the bucket.

The hook and loop strip 40 is wider than strip 44 so that the strip 44 may be placed at various horizontal locations on the strip 49 when joining the ends together so that the circumference of the tool holder about the bucket may be varied as needed. Of course, fasteners other than the hook and loop fasteners 40 and 44 could be utilzed to join the ends of the tool holder together around a bucket.

When the tool holder is placed on the bucket 4, the openings of the pockets are directed upwardly to receive various tools which the user wishes to store in the holder. Larger tools would be carried in the bucket 4 while the smaller tools will be placed in the various pockets of the tool holder. Since the tool holder hangs generally vertically from the bucket handle 6, the small tools placed in the pockets of the tool holder may be securely held and carried.

It is to be understood that the above-described arrangements are only illustrative of the application of the principles of the present invention. Numerous modifications and alternative arrangements may be devised by those skilled in the art without departing from the spirit and scope of the invention and the appended claims are intended to cover such modifications and arrangements.

What is claimed is:

1. A bucket attachment tool holder for mounting on a conventional bucket having a loop handle comprising
    an elongate piece of flexible material formed with pockets on one side thereof for receiving and holding tools and the like, with the pocket openings being generally contiguous with or directed toward a top edge of the material,
    fastener means disposed near each end of the piece of material for joining the ends together when the piece of material is wrapped around the exterior side walls of the bucket and the pockets are on the outside surface of the material, and
    two coupling elements disposed on the piece of material at spaced-apart locations near or on the top edge thereof for attaching to the top rim or handle of the bucket so that the pocket openings face upwardly.

2. A bucket attachment as in claim 1 wherein said piece of material comprises a first section of elongate material formed to lie generally flat, and one or more second sections joined to the firt section to form pockets thereon.

3. A bucket attachment as in claim 2 wherein said second section comprises a single piece of material gathered and loosened when joined to the first section to thereby form pockets, with the bottom edge of the second section being attached to the first section.

4. A bucket attachment as in claim 3 wherein said first and second sections are made of canvas.

5. A bucket attachment as in claim 1 wherein said fastener means comprises a two element hook and loop fastener, one element of which is attached to one side of said piece of material near one end thereof, and the other element of which is attached to the other side of said piece of material near the other end thereof so that when the piece of material is wrapped about the bucket and the ends of the material are overlapped, the two elements of the hook and loop fastener mate and adhere together.

6. A bucket attachement as in claim 5 wherein one of the elements of the hook and loop fastener is wider than the other element so that said other element may be mated with said one element at variable horizontal locations therealong to thereby allow for varying the circumference of the piece of material when it is wrapped about a bucket.

7. A bucket attachment as in claim 1 wherein said coupling elements each comprise a hook attached at a base end to the piece of material, with a hooked end extending upwardly from the top edge of the material.

8. A bucket attachment as in claim 7 wherein said hook coupling elements each further comprise a swivel joint between the base end and the hooked end to allow rotation of the hooked end relative to the base end.

* * * * *